United States Patent
Choi et al.

(10) Patent No.: US 8,493,514 B2
(45) Date of Patent: Jul. 23, 2013

(54) APPARATUS FOR CONTROLLING COLOR TEMPERATURE

(75) Inventors: Yoon Seok Choi, Seoul (KR); Hun Cheol Lee, Seoul (KR); Hak Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1406 days.

(21) Appl. No.: 12/174,478

(22) Filed: Jul. 16, 2008

(65) Prior Publication Data

US 2009/0021647 A1 Jan. 22, 2009

(30) Foreign Application Priority Data

Jul. 16, 2007 (KR) .................. 10-2007-0070991
Jul. 16, 2007 (KR) .................. 10-2007-0070992
Jul. 16, 2007 (KR) .................. 10-2007-0070996

(51) Int. Cl.
*H04N 9/73* (2006.01)

(52) U.S. Cl.
USPC ........... 348/655; 348/649; 348/658; 348/659; 345/590; 345/610

(58) Field of Classification Search
USPC ............... 348/649, 658, 655, 659; 345/590, 345/610
See application file for complete search history.

(56) References Cited

U.S. PATENT DOCUMENTS

| | | | | |
|---|---|---|---|---|
| 5,361,093 A | * | 11/1994 | Yamamoto et al. | 348/223.1 |
| 5,555,022 A | * | 9/1996 | Haruki et al. | 348/223.1 |
| 5,563,654 A | * | 10/1996 | Song | 348/223.1 |
| 6,504,551 B1 | * | 1/2003 | Takashima et al. | 345/649 |
| 6,992,729 B2 | * | 1/2006 | Shirata et al. | 348/673 |
| 7,184,079 B2 | * | 2/2007 | Hoshuyama | 348/223.1 |
| 7,190,410 B2 | * | 3/2007 | Inamura | 348/656 |
| 7,460,181 B2 | * | 12/2008 | Luu et al. | 348/649 |
| 8,111,263 B2 | * | 2/2012 | Kimura et al. | 345/589 |
| 2002/0018129 A1 | * | 2/2002 | Ikeda | 348/223 |
| 2003/0193629 A1 | * | 10/2003 | Yamaguchi | 349/61 |
| 2004/0178933 A1 | * | 9/2004 | Umeda | 341/63 |
| 2006/0164700 A1 | * | 7/2006 | Hayashi | 358/518 |
| 2008/0316343 A1 | * | 12/2008 | Min et al. | 348/294 |

* cited by examiner

*Primary Examiner* — Pankaj Kumar
*Assistant Examiner* — Sahar Baig
(74) *Attorney, Agent, or Firm* — Birch, Stewart, Kolasch & Birch, LLP

(57) ABSTRACT

Disclosed is the apparatus for controlling color temperature enabling the color region determiner to determine whether the inputted chroma signal value in pixels belongs to a pre-set achromatic color region or a chromatic color region, and the color temperature corrector to correct the chroma signal gains according to the determined achromatic color region or chromatic color region.

20 Claims, 16 Drawing Sheets

(a)

(b)

(c)

APPARATUS FOR CONTROLLING COLOR TEMPERATURE

CROSS-REFERENCE TO RELATED APPLICATION

The present application is based on, and claims priority from, Korean Application Numbers 10-2007-0070991, 10-2007-0070992 and 10-2007-0070996, filed Jul. 16, 2007, the disclosure of which is incorporated by reference herein in its entirety.

BACKGROUND

The following description relates to image display devices such as digital color television sets, and more particularly to an apparatus for controlling color temperature capable of adjusting color temperature displayed on a display panel.

Increased demand on image display devices such as digital television sets has greatly intensified the competition in the manufacturing industries of digital television sets. Particularly, the color quality, one of the important features of the image display devices, sits in the middle of the competition.

The degree of noise, contrast ratio, color and sharpness in the image display devices may be the essential elements determining the color quality of images displayed on a display panel. An element that stimulates eyes of a user the most is the color, where white is the most important color of all the colors.

The color of white is a base for color reproduction, and an overall color characteristic of an image display device may be determined by what color of white is expressed on the display panel by the image display device.

An element that gives a clean feeling to an overall image displayed on the display panel is color temperature. The color temperature is defined by absolute temperature K. In other words, the term of color temperature denotes the temperature of light caused by perfect thermal radiation, and is measured in kelvin (K). When a standard black body is heated to a certain temperature, the color of the black body changes gradually in the following sequence: deep red, shallow red, orange, yellow, and finally blue.

Typically, the color temperature of a white color area in a displayed image is set to be 9300K or more in a conventional chromaticity diagram of general televisions, higher than a standard color temperature of 6500K of the general televisions, and in some cases, the color temperature is set to be 12000K or more, so that a user feels less tired and works with the displayed image efficiently for a long period of time.

The reason of setting high the color temperature of a white color is to attract the eyes of consumers, because the higher color temperature may give a very high visual effect even in the white color of the same luminance.

However, if color temperature of white color is increased, the overall image colors displayed on the display panel are changed to blue, thus expressing the face color with no healthy look, or making other essential colors undesirable to the eyes of the user. In order to eliminate this problem, a technique called "blue stretch" has been introduced for adjusting color temperatures by dividing pixels belonging to achromatic color region from pixels of chromatic color region. "Blue stretch" refers to increasing the blue value of white and near white colors in order to make whites appear brighter to the eye. When applying blue stretch to a set of pixels it is desirable to avoid blue stretching pixels in specified color ranges. Furthermore, it is desirable to prevent visible boundaries between areas that have been blue stretched and areas that have not been blue stretched.

To be more specific, the pixels of achromatic color region are adjusted to high temperature of colors, while the pixels of chromatic color region are adjusted to low temperature of colors.

The respective adjustment of color temperatures in response to the pixels of achromatic color region and the pixels of chromatic color region would make it possible to enhance the color temperature of white color only without changing the face color or other essential colors.

The pixels of achromatic color region and pixels of chromatic color region is typically determined by a value of luminance signal (Y), values of chroma (chrominance) signals (U and V) in a YUV space.

For example, a value range of luminance signal (Y), $0 \leq Y \leq Ya$, a value range of chroma signal (U), $-Ua \leq U \leq Ua$, and a value range of chroma signal (V), $-Va \leq V \leq Va$ are predetermined by a color region determiner.

At this time, Ya is $128 \pm \alpha$ if value of luminance signal (Y) is in the range of 0255, Ua and Va are $64 \pm \alpha$ if values of the chroma signals (U and V) are in the range of -127128 (where, a is a predetermined value in response to a user's own liking), where Ua=Va.

Values of the luminance signal (Y) and chroma signals (U, V) in a pixel are determined as achromatic color pixels by the color region determiner if satisfying all the conditions of $0 \leq Y \leq Ya$, $-Ua \leq U \leq Ua$ and $-Va \leq V \leq Va$, and determined as chromatic color pixels if not satisfying any one of $0 \leq Y \leq Ya$, $-Ua \leq U \leq Ua$ and $-Va \leq V \leq Va$.

If values of luminance signal (Y) and values of chroma signals (U,V) satisfy all the condition of $0 \leq Y \leq Ya$ 乳 $U^2+V^2 \leq Ua^2$ while the luminance signal (Y) is in the range of $0 \leq Y \leq Ya$, and chroma signals (U, V) are in the range of $U^2+V^2 \leq Ua^2$, the pixels of luminance signal (Y) and chroma signals (U,V) are determined as achromatic color pixels, and if not satisfying any one of $0 \leq Y \leq Ya$ and $U^2+V^2 \leq Ua^2$ the color region determiner determines the pixels as chromatic color pixels.

However, the achromatic color region belonging to -Ua0 and 0Va out of the achromatic color regions thus described is a region adjacent to the color of blue, so that, if color temperature correction is performed, the color of white in the blue region may be color temperature-corrected to generate an over-rated blue stretch, thereby resulting in the color of white that is hardly accepted by the consumers.

SUMMARY

Additional aspects and advantages of the present general inventive concept will be set forth in part in the description which follows and, in part, will be obvious from the description, or may be learned by practice of the general inventive concept. It is therefore a primary objective of the claimed invention to provide an apparatus for controlling color temperature capable of enhancing image quality displayed on a display panel without generating an over-rated blue stretch.

Another objective is to provide an apparatus for controlling color temperature capable of correcting color temperature by dividing an image signal into blocks each of a predetermined size according to average brightness, average amount of change and the number of achromatic color pixels of each divided block, thereby making a regional boundary of each block invisible.

In one general aspect, an apparatus for controlling color temperature comprises: a color region determiner determining whether values of luminance signal and chroma signals belong to a predetermined achromatic color region or chromatic color region; and a color temperature corrector correcting a color temperature by controlling gains of the luminance signal and chroma signals as a result of the determination by the color region determiner, wherein the values of achromatic color region set up by the color region determiner are such that the value of the luminance signal (Y) satisfies the condition of $0 \leq Y \leq Ya$ (where, Ya is a predetermined experimental value), and the chroma signals (U,V) satisfy all the conditions of $-Ua \leq U \leq Ua$ and $-Va \leq V \leq Va$ (where, Ua and Va are predetermined experimental values) on a UV plan, where the achromatic color region on a quadrant is a region that satisfies all the conditions of $-Ua \leq U \leq 0$ and $0 \leq V < Va$.

In another general aspect, an apparatus for controlling color temperature comprises: a color region determiner determining whether values of luminance signal and chroma signals belong to a predetermined achromatic color region or chromatic color region; and a color temperature corrector correcting a color temperature by controlling gains of the luminance signal and chroma signals as a result of the determination by the color region determiner, wherein the value of achromatic color region set up by the color region determiner is a region that satisfies the condition of $U^2+V^2 \leq Ua^2$ on the UV plane, but the achromatic color region on a quadrant is a region that satisfies the condition of $U^2+V^2 < Ua^2$ (where, $-Ua \leq U \leq 0$ and, $0 \leq V \leq Va$).

In still another general aspect, an apparatus for controlling color temperature comprises: a block divider dividing an YUV color space signal into a block of predetermined size; a color region determiner detecting pixels of achromatic color region existing within each block divided by the block divider and calculating the number of pixels in the achromatic region; and a color temperature corrector correcting the color temperature of pixels in the block outputted by the block divider, by calculating a luminance signal average value of pixels in the achromatic color region determined by the color region determiner, the number of pixels in the achromatic color region calculated by the color region determiner, an average value of chroma signal of each pixel and a corrected value of each pixel using the variation average value of chroma signals of each pixel.

In another general aspect, an apparatus for controlling color temperature comprises: a color region determiner determining whether an inputted signal of RGB (Red, Green, Blue) color space belongs to an achromatic color region or a chromatic color region; and a color temperature controller controlling a color temperature by multiplying a gain control value in response to a determination signal from the color region determiner by the signal of the RGB color region.

BRIEF DESCRIPTION OF DRAWINGS

The present general inventive concept will now be described more fully hereinafter with reference to the accompanying drawings, in which exemplary non-limiting implementations of the invention are shown. Like reference numerals refer to like elements throughout.

DETAILED DESCRIPTION

It is to be understood that the disclosed implementations are merely exemplary, which can be implemented in various forms. Therefore, specific structural and functional details disclosed herein are not to be interpreted as limiting, but merely as a basis for the claims and as a representative basis for teaching one skilled in the art to variously employ the implementations of the present novel concept in any virtually appropriately detailed structure. For the purpose of clarity, technical material that is known in the technical fields related to the inventive concept has not been described in detail so that the concept is not unnecessarily obscured.

Figure 1:
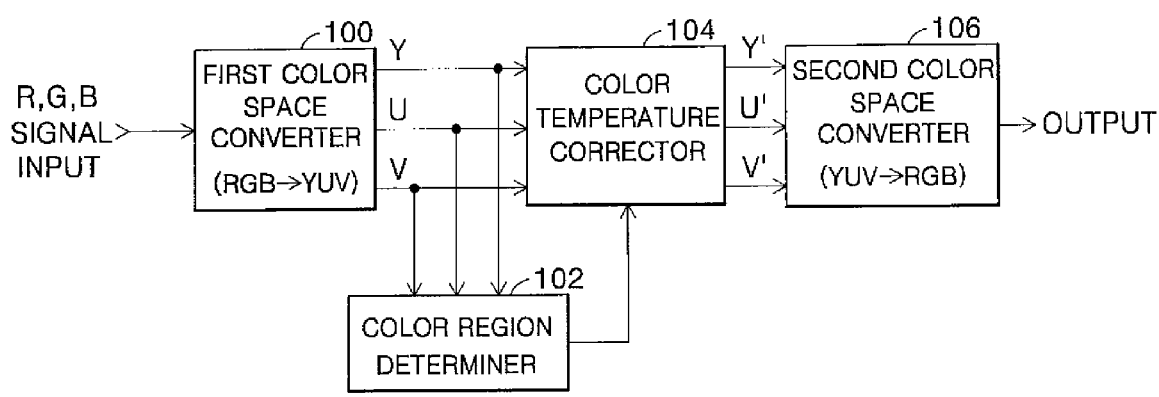
FIG. 1 is a block diagram illustrating construction of an apparatus for controlling color temperature according to an exemplary implementation.

FIG. 1 is a block diagram illustrating construction of an apparatus for controlling color temperature according to an exemplary implementation, where reference numeral 100 is a first color space converter serving to convert signals of RGB (Red, Green, Blue) color space inputted from outside to YUV color space signals.

Reference numeral 102 defines a color region determiner serving to set up beforehand an achromatic color region and a chromatic color region and to determine whether a relevant pixel belong to achromatic color region or a chromatic color region using value of luminance signal (Y) and values of chroma signals (U,V) outputted by the first color space converter 100.

Reference numeral 104 defines a color temperature corrector. The color temperature corrector 104 may multiply a gain control value predetermined by a color region of the color region determiner 102 by the luminance signal (Y) and chroma signals (U,V) outputted by the first color space converter 400 to generate color-corrected luminance signal (Y') and chroma signals (U,V).

Reference numeral 106 is a second color space converter converting the luminance signal (Y') and chroma signals (U,V) color-corrected by the color temperature corrector 104.

In the apparatus for controlling color temperature thus described, an inputted signal of RGB color space may be converted to an YUV color space signal by the first color space converter 100. The luminance signal (Y) and the chroma signals (U,V) converted by the first color space converter 100 may be inputted to the color region determiner 102 and the color temperature corrector 104. Successively, the color region determiner 102 may determine whether the inputted values of luminance signal (Y) and chroma signals (U,V) belong to predetermined achromatic color region or chromatic color region.

Figure 2:
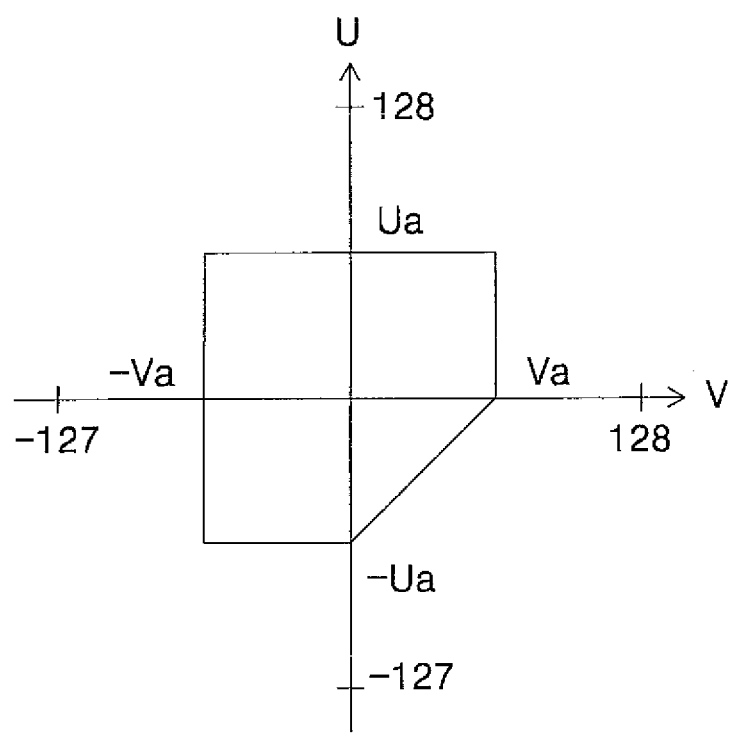
FIGS. 2 to 7 are graphs illustrating an operation of determining a color region by a color region determiner in an apparatus for controlling color temperature.

For example, the color region determiner 102 is set up in advance with a value of 0≦Y≦Ya of an achromatic color region relative to the luminance signal (Y), and an achromatic color region relative to the chroma signals (U,V), as illustrated in FIG. 2. In other words, the color region determiner 102 may determine a relevant pixel as the achromatic color region if the value of inputted luminance signal (Y) satisfies the condition of 0≦Y≦Ya, and each value of chroma signals (U,V) all satisfies the conditions of −Ua≦U≦Ua and −Va≦V≦Va, and the values of chroma signals (U,V) meet the condition of U≧V−Ua. Otherwise, the color region determiner 102 may determine the relevant pixel as pixel of chromatic color region.

A color region determination signal determined by the color region determiner 102 may be inputted to the color temperature corrector 104, where the color temperature corrector 104 may multiply the gain control value predetermined in response to the color region determined by the color region determiner 102 by the luminance signal (Y) and chroma signals (U,V) of relevant pixel to correct the color temperature.

For example, if a color region is determined as an achromatic color region, the color temperature corrector 104 may multiply the luminance signal (Y) and chroma signals (U,V) by gain control values of Ygain1, Ugain1 및 Vgain1 to control the color as shown in Equation 1.

$$Y' = Y \times Ugain1 \quad \text{[Equation 1]}$$

$$\begin{cases} U' = U \times Ugain1 \\ V' = V \times Vgain1 \end{cases}$$

If the color region is determined as a chromatic color region, the color temperature corrector 104 may multiply the luminance signal (Y) and chroma signals (U,V) by gain control values of Ygain2, Ugain2 및 Vgain2 to control the color as shown in Equation 2.

$$Y' = Y \times Ygain2 \quad \text{[Equation 2]}$$

$$\begin{cases} U' = U \times Ugain2 \\ V' = V \times Vgain2 \end{cases}$$

If the color temperature is corrected as shown above, a second color space converter 106 may convert the color-corrected luminance signal (Y') and chroma signals (U', V') to RGB space signals and outputs to the outside.

It should be noted that there may be several methods for reducing an achromatic color region of blue color area performed by the color region determiner 102.

Figure 3:
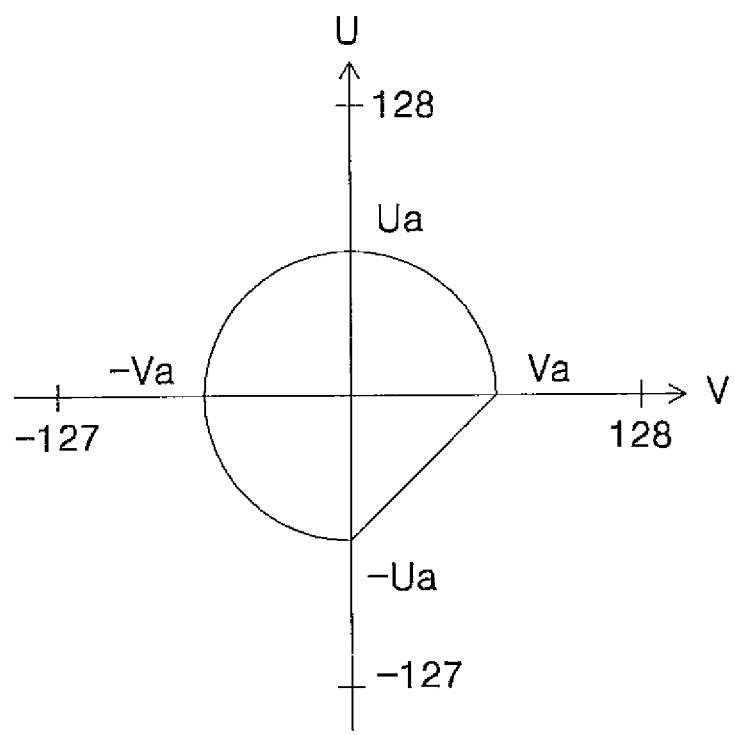

For example, as illustrated in FIG. 3, the color region determiner 102 may determine a relevant pixel as achromatic color region if the values of chroma signals (U,V) meet all the condition of $U^2+V^2 \leq Ua^2$ and U≧V−Ua, and if not, the color region determiner 102 determines the relevant pixel as chromatic color region.

Figure 4:
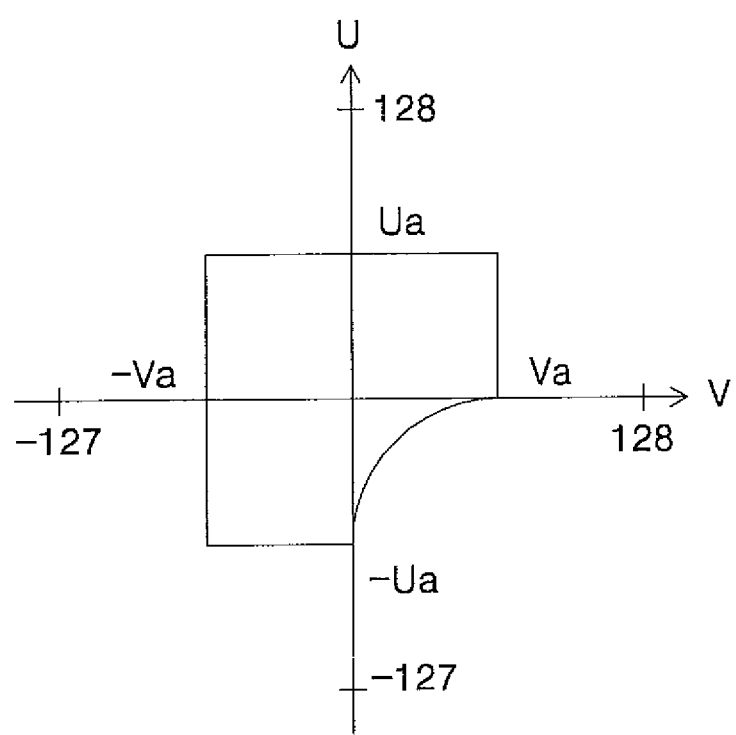

Referring to FIG. 4, if the conditions of −Ua≦U≦Ua and −Va≦V≦Va are all met, and the condition of $(U-Ua)^2+(V-Va)^2 \geq Ua^2$ is satisfied, the color region determiner 102 may determine the relevant pixel as the achromatic color region and if not met, the color region determiner 102 may determine the relevant pixel as chromatic color region.

Figure 5:
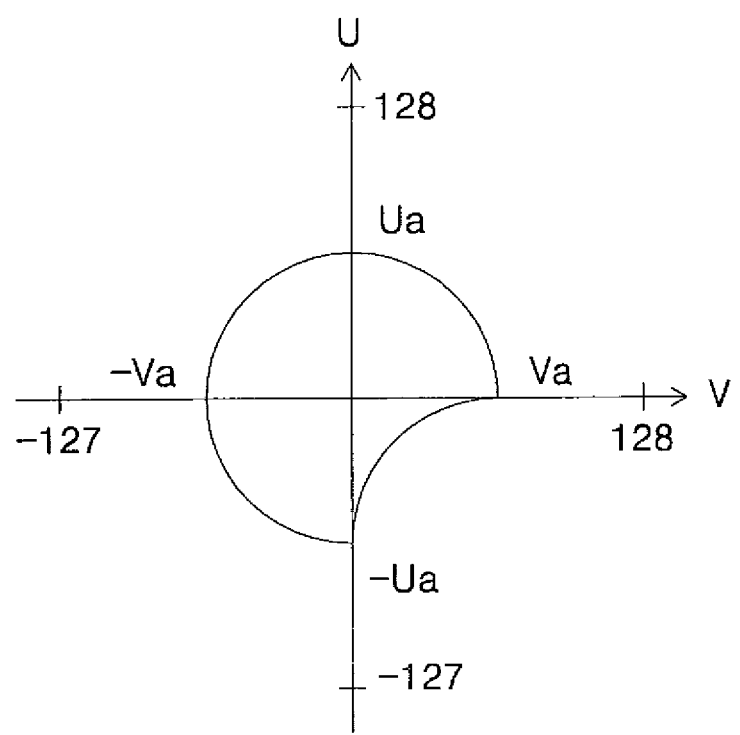

If the conditions of $U^2+V^2 \leq Ua^2$ and $(U-Ua)^2+(V-Va)^2 \geq Ua^2$ are all met, the color region determiner may determine the relevant pixel as achromatic color region, and if not met, the color region determiner may determine as achromatic color region as illustrated in FIG. 5.

Figure 6:
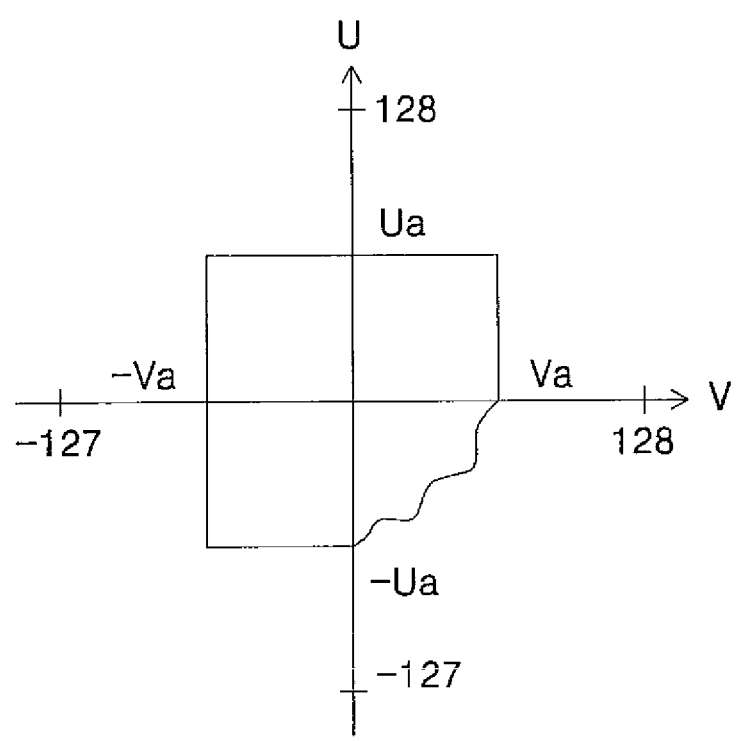

Furthermore, the achromatic color region of blue area may be set up randomly by an operator. For example, as illustrated in FIG. 6, the relevant pixel may be determined as achromatic color region by an operator satisfying the conditions of −Ua≦U≦Ua and −Va≦V≦Va, and randomly connecting a coordinate (0, −Ua) and a coordinate (Va, 0).

Figure 7:
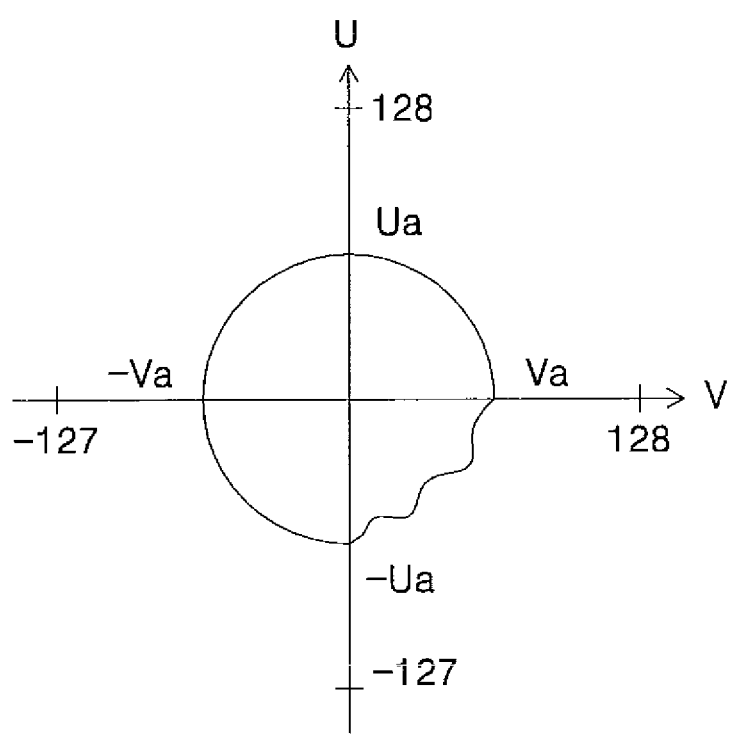

Furthermore, as illustrated in FIG. 7, the relevant pixel may be determined as an achromatic color region by an operator satisfying the condition of $U^2+V^2 \leq Ua^2$ and randomly connecting a coordinate (0, −Ua) and a coordinate (Va, 0).

Still furthermore, the values of chroma signals (U,V) satisfying the above mentioned Equations are pre-stored in a look-up table using the color region determiner 102, and determination may be made as to whether the relevant pixels are in the achromatic color region and chromatic color region using the pre-stored values in the look-up table.

Figure 8:
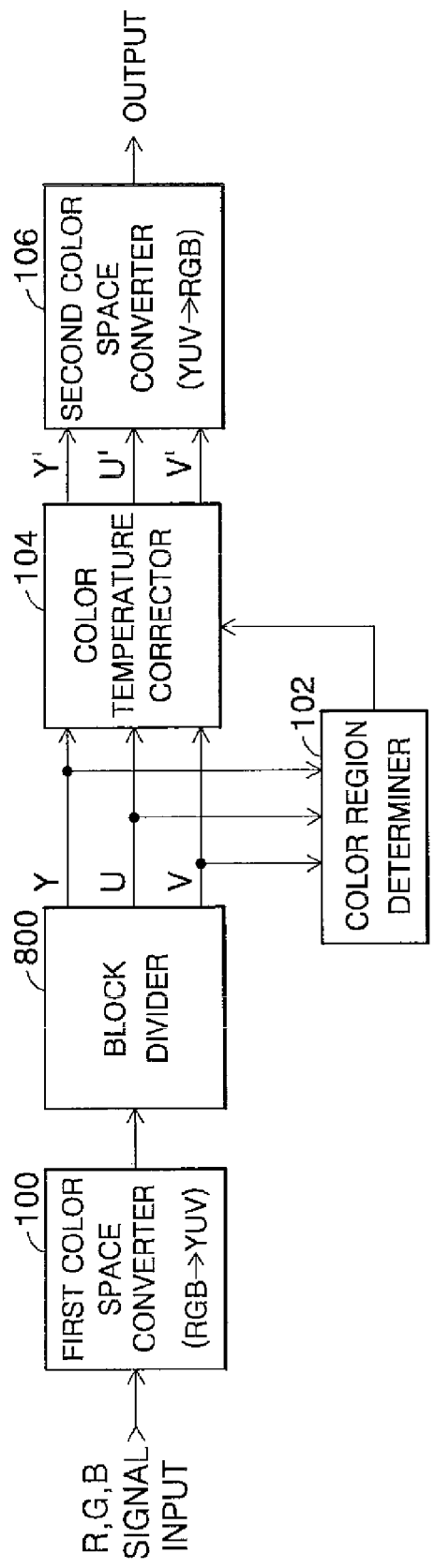
FIG. 8 is a block diagram illustrating construction of an apparatus for controlling color temperature according to another exemplary implementation.

FIG. 8 is a block diagram illustrating construction of an apparatus for controlling color temperature according to another exemplary implementation, where the apparatus may include a block divider 800 between the first color space converter 100, and a color region determiner 102 and a color temperature corrector 104.

The block divider 800 may divide pixel signals of YUV color space outputted from the first color space converter 100 to a block composed of a pixel signal of, for example, 8×8 size.

The pixel signals of each block divided by the block divider 800 are inputted into the color region determiner 102 and the color temperature corrector 104.

Figure 9:
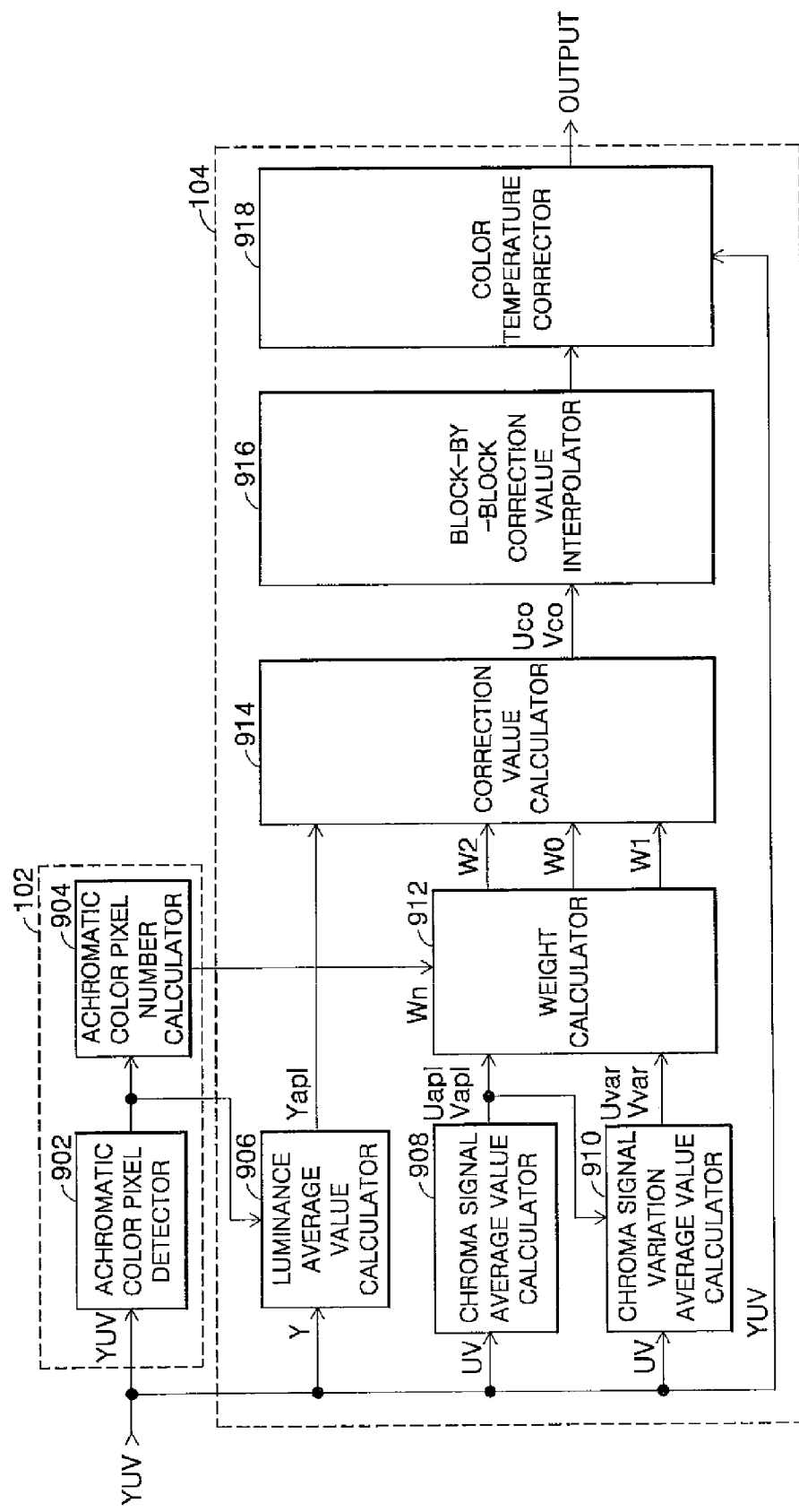
FIG. 9 is a block diagram illustrating a detailed construction of a color region determiner and a color temperature corrector of FIG. 8.

Referring to FIG. 9, the color region determiner 102 may include an achromatic color pixel detector 902 and an achromatic color pixel number calculator 904.

The achromatic color pixel detector 902 may detect the achromatic color region pixels by values of the luminance signal (Y) and the chroma signals (U, V) of pixels in each divided block.

For example, as illustrated in FIGS. 2 to 7, the achromatic color pixel detector 902 may set up in advance a value of the luminance signal and the values of the chroma signals (U,V) belonging to the achromatic color region to determine the value of the luminance signal (Y) and the chroma signals (U,V) of each pixel in the blocks inputted from the block divider 800 and detect whether a relevant pixel is a pixel belonging to an achromatic color region or to a chromatic color region.

When the achromatic color pixel detector 902 detects the achromatic color region pixels, the achromatic color pixel number calculator 904 may calculate the detected number (Wn) of the achromatic color region pixels and output the calculated pixel number of achromatic color region. In other words, the achromatic color pixel number calculator 904 calculates the number of pixels in the achromatic color region included in each block divided by the block divider 800.

The color temperature corrector 104 may include a luminance average value calculator 906, a chroma signal average value calculator 908, a chroma signal variation average value calculator 910, a weight calculator 912, a corrected value calculator 914, a block-by-block corrected value interpolator 916 and a corrector 918.

The luminance average value calculator 906 may calculate an average value (Yapl) of luminance signal in the achromatic color pixels using the luminance signal (Y) in the achromatic color pixels detected by the achromatic color pixel detector 902.

The chroma signal average value calculator 908 may calculate average values (Uapl, Vapl) of the chroma signals (U, V) in the pixels of each block divided by the block divider 800. The chroma signal variation average value calculator 910 may calculate absolute average values (Uvar, Vvar) of variations of the chroma signals (U,V) of each block divided by the block divider 800 based on the chroma signal average values (Uapl, Vapl) calculated by the chroma signal average value calculator 908.

The weight calculator 912 may calculate predetermined weights (W0, W1, W2) using the number (Wn) of achromatic color region pixels detected by the achromatic color pixel number detector 904, the average values (Uapl, Vapl) of chroma signals (U, V) calculated by the chroma signal average value calculator 908 and the absolute values (Uvar, Vvar) of variations of the chroma signals (U, V) calculated by the chroma signal variation average value calculator 910.

The corrected value calculator 914 may calculate correction values (Uco, Vco) for correcting color temperatures of each block using the weights (W0, W1, W2) calculated by the weight calculator 912 and the luminance average value (Yapl) calculated by the luminance average value calculator 906. The block-by-block correction value interpolator 916 may interpolate the block-by-block correction values (Uco, Vco) calculated by the correction value calculator 914. The corrector 918 may correct the color temperatures of the luminance signal (Y) and the chroma signals (U, V) by the correction values interpolated by the block-by-block correction value interpolator 916.

The color temperature corrector 104 may use the luminance signal (Y) of pixels in the achromatic color region detected from the achromatic color pixel detector 902 by the luminance average value calculator 906 to calculate the average value (Yapl) of the luminance signals in the achromatic color region pixels.

The chroma signal average value calculator 908 may calculate the average values (Uapl, Vapl) of chroma signals (U, V) of the total pixels existing within each divided block.

The chroma signal variation average value calculator 910 may detect variations of chroma signals (U,V) of each pixel based on the average values (Uapl, Vapl) of chroma signals (U,V) calculated by the chroma signal average value calculator 908 and calculate the average values (Uvar, Vvar) of the detected variations of the chroma signals (U,V). In other words, the chroma signal variation average value calculator 910 detects a variation which is a difference between the calculated average values (Uapl, Vapl) of chroma signals (U,V) calculated by the chroma signal average value calculator 908 and values of chroma signals (U, V) of each pixel, and calculates the average values (Uvar, Vvar) of the detected variations.

The calculated average values (Uapl, Vapl) of chroma signals (U,V), the calculated average values (Uvar, Vvar) of variations of chroma signals (U,V), and the number (Wn) of pixels in the achromatic color region are inputted into the weight calculator 912. The weight calculator 912 may then calculate the weights (W0, W1, W2) relative to the calculated average values (Uapl, Vapl) of chroma signals (U,V), the calculated average values (Uvar, Vvar) of variations of chroma signals (U,V), and the number (Wn) of pixels in the achromatic color region.

Figure 10:
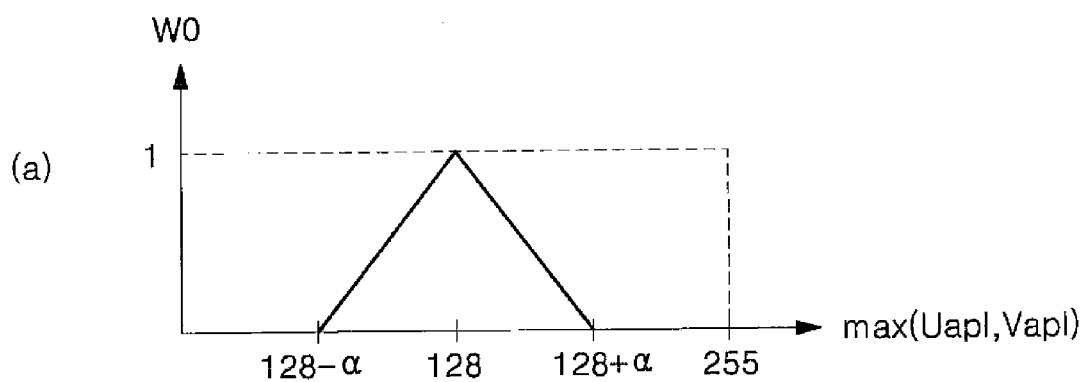
FIGS. 10a to 10c are graphs illustrating an operation of calculating a weight by a weight calculator of FIG. 9.
Figure 10:
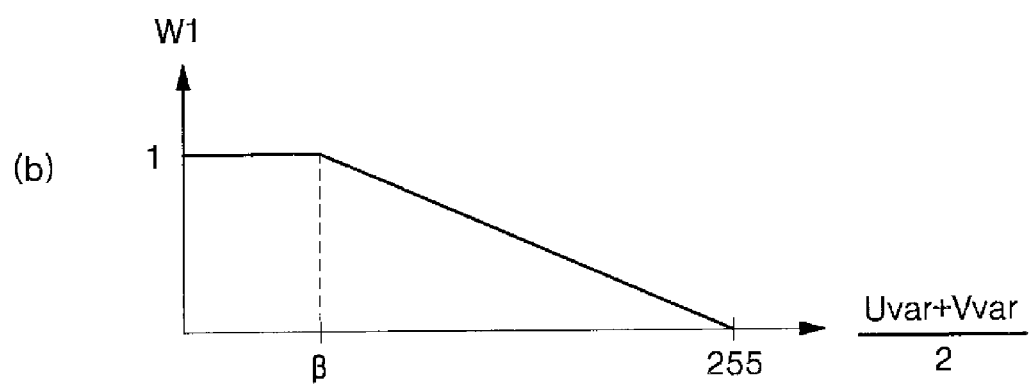
Figure 10:
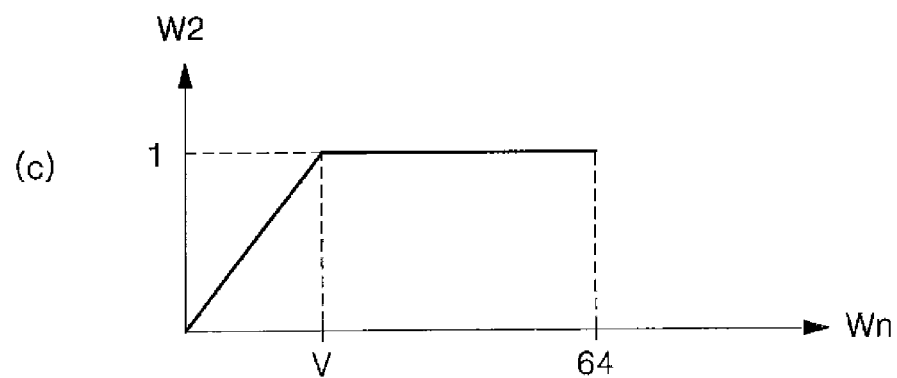

For example, the weight calculator 912 may store in advance in the look-up table, the weight (W0) relative to the calculated average values (Uapl, Vapl) of chroma signals (U,V) as illustrated in FIG. 10a, the weight (W1) relative to the calculated average values (Uvar, Vvar) of variations of chroma signals (U,V), as illustrated in FIG. 10b, and the weight (W2) relative to the number (Wn) of pixels in the achromatic color region as illustrated in FIG. 10c.

The weight calculator 912 may calculate from the pre-stored look-up table, the weight (W0) relative to the calculated average values (Uapl, Vapl) of chroma signals (U,V) inputted from the chroma signal average value calculator 908, the weight (W1) relative to the calculated average values (Uvar, Vvar) of variations of chroma signals (U,V), and the weight (W2) relative to the number (Wn) of the achromatic color region pixels.

Furthermore, the weight calculator 912 may pre-set up the Equation 3 below relative to the graph illustrated in FIG. 10a, the Equation 4 below relative to the graph illustrated in FIG. 10b, and the Equation 5 below relative to the graph illustrated in FIG. 10c.

$$W0 = 0, \quad \max(Uapl, Vapl) \leq 128 - \alpha \text{ or } \max(Uapl, Vapl) > 128 + \alpha \quad \text{[Equation 3]}$$

$$\begin{cases} W0 = \frac{1}{\alpha}\max(Uapl, Vapl) - \frac{128}{\alpha} - 1, & 128 - \alpha < \max(Uapl, Vapl) \leq 128 \\ W0 = -\frac{1}{\alpha}\max(Uapl, Vapl) + \frac{128}{\alpha} + 1, & 128 < \max(Uapl, Vapl) \leq 128 + \alpha \end{cases}$$

$$W1 = 1, \quad 0 < \frac{Uvar + Vvar}{2} \leq \beta \quad \text{[Equation 4]}$$

$$\begin{cases} W1 = -\frac{1}{255 - \beta} \frac{Uvar + Vvar}{2} + \frac{\beta}{255 - \beta} + 1, & \beta < \frac{Uvar + Vvar}{2} \end{cases}$$

$$W2 = \frac{1}{\gamma}Wn, \quad 0 < Wn \leq \gamma \quad \text{[Equation 5]}$$

$$\{W2 = 1, \quad \gamma < Wn$$

In other words, the weight (W0) relative to the average values (Uapl, Vapl) of the chroma signals (U, V) may be set as W0=0 if max(Uapl, Vapl)≦128−α or max(Uapl, Vapl)>128+α as in the EQUATION 3, and set as if 128−α<max(Uapl, Vapl)≦128, and set as if 128<max(Uapl, Vapl)≦128+α.

The weight (W1) relative to the average values (Uvar, Vvar) of variations of chroma signals (U,V) is set as W1=1, if as in the EQUATION 3, and set as if.

Furthermore, the weight (W2) relative the number (Wn) of the achromatic color pixels may be set as as in EQUATION 4 if, and set as W2=1 if.

When the EQUATIONS 3 to 5 are set, the weight calculator 912 may calculate from the EQUATIONS 3 to 5 the weights (W0, W1, W2) relative to the average values (Uapl, Vapl) of chroma signals (U,V) inputted from the chroma signal average value calculator 908, the average values (Uvar, Vvar) of variations of chroma signals (U,V) inputted from the chroma signal variation average value calculator 910, and the number (Wn) of the achromatic color region pixels inputted from the achromatic color pixel number calculator 904.

When the weights W0, W1, W2 are calculated, the correction value calculator 914 may use the calculated weights W0, W1, W2, and the luminance average value (Yapl) calculated by the luminance average value calculator 906 to calculate correction values (Uco, Vco), where the calculation of the correction values (Uco, Vco) is done by using, for example, the EQUATION 6.

$$\begin{cases} Uco = Yapl \times W0 \times W1 \times W2 \times Ugain \\ Vco = Yapl \times W0 \times W1 \times W2 \times Vgain \end{cases} \quad \text{[Equation 6]}$$

where, Ugain and Vgain are experimentally pre-set gain control values.

When the correction values (Uco, Vco) for controlling the color temperatures are calculated, the block-by-block correction value interpolator 916 may interpolate the correction values of each block to prevent region borders of each block from being displayed on the display panel.

Figure 11:
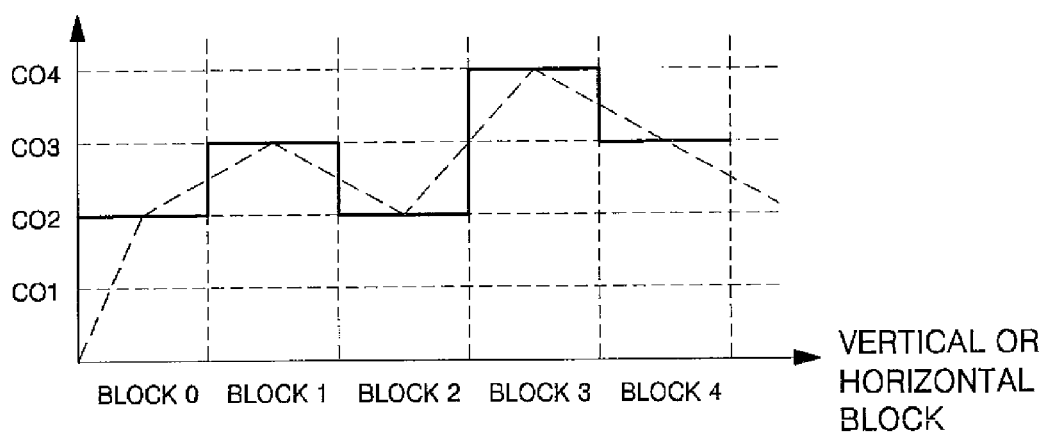
FIG. 11 is a graph illustrating an operation interpolating a correction value by a block-by-block correction value interpolator.

For example, as illustrated in FIG. 11, under the assumption that respective correction values (Uco, Vco) for the sequentially bordering blocks 04 are co2, co3, co2, co4 and co3 as indicated in solid lines, a block border between block 2 and block 3 where there is a big correction value difference between Uco and Vco is not shown on the display panel.

As a result, as illustrated in dotted lines of FIG. 11, the block-by-block correction value interpolator 916 may interpolate the correction values (Uco, Vco) between the blocks to prevent the block borders from being displayed on the display panel.

When the correction values (Uco, Vco) are interpolated, the color temperature interpolator 918 may use the interpolated correction values (Uco', Vco') to interpolate the color temperatures of the luminance signal (Y) and the chroma signals (U,V). For example, the color temperature corrector 918 may use the EQUATION 7 to correct the color temperatures of the luminance signal (Y) and the chroma signals (U, V), and output the color temperature-corrected signal of YUV color space to the second color space converter 108.

$$\begin{cases} Uco = Yapl \times W0 \times W1 \times W2 \times Ugain \\ Vco = Yapl \times W0 \times W1 \times W2 \times Vgain \end{cases} \quad \text{[Equation 7]}$$

where, Y', U', V' are luminance signal and chroma signals that are color temperature corrected, and Ygain is an experimentally pre-set value and Uco' and Vco' are correction values interpolated by the block-by-block correction value interpolator 916.

Figure 12:
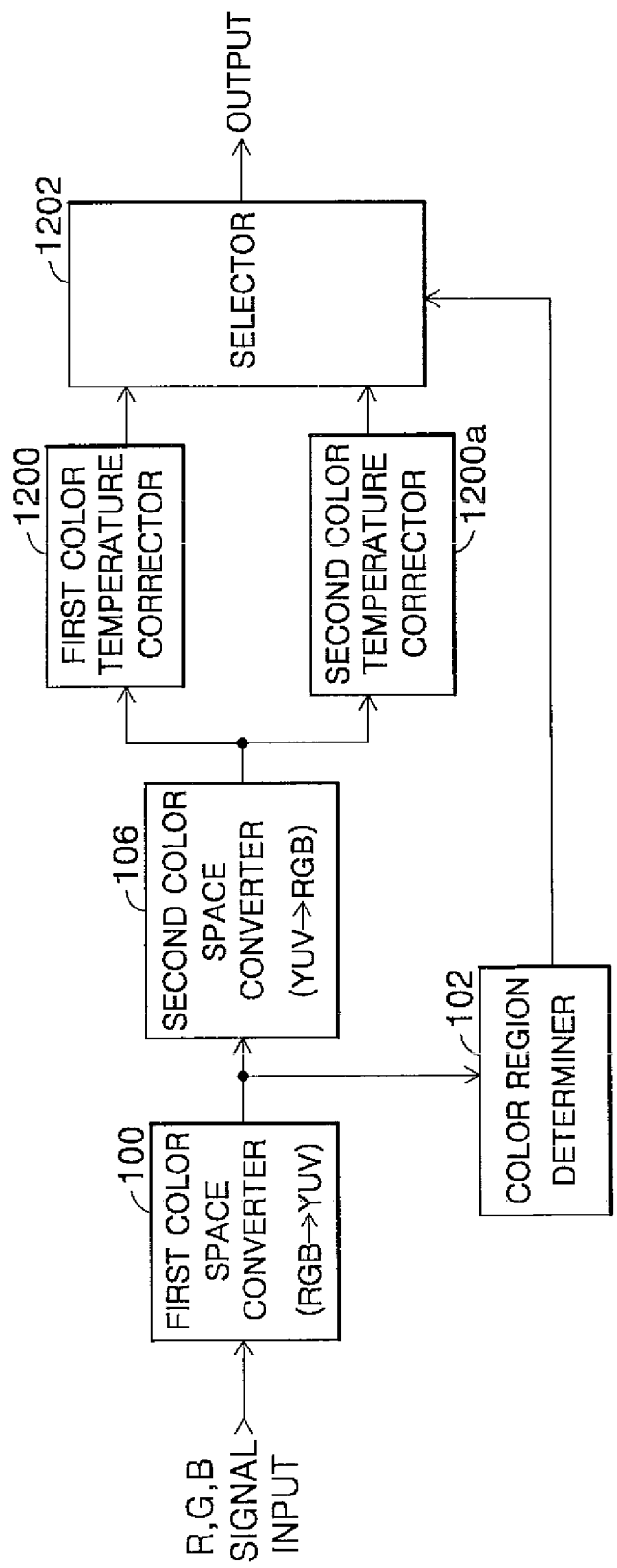
FIG. 12 is a block diagram illustrating an apparatus for controlling color temperature according to still another exemplary implementation.

FIG. 12 is a block diagram illustrating an apparatus for controlling color temperature according to still another exemplary implementation.

Referring to FIG. 12, an output terminal of the second color space converter is mounted with a first color temperature corrector 1200 and a second color temperature corrector 1200a.

A selector 1202 may select signals corrected by the first color temperature corrector 1200 or the second color temperature corrector 1200a according to color regions determined by the color region determiner 102 and output the signals.

In still another exemplary implementation, an RGB color space signal outputted from outside may be converted to an YUV color space signal by the first color space converter 100 and inputted to the color region determiner 102.

The color region determiner 102 may determine whether a relevant pixel belongs to an achromatic color region or a chromatic color region using the luminance signal (Y) and chroma signals (U,V) in the inputted YUV color space signal.

The determination signal determined of the color region by the color region determiner 102 may be inputted into the selector 1202.

The YUV color space signal converted by the first color space converter 102 is converted to an original RGB color space signal by the second color space converter 106 and inputted into the first and second color temperature corrector 1200, 1200a.

The first color temperature corrector 1200 serves to correct the color temperature of color signals of the achromatic color region. For example, as shown in EQUATION 8, the first color temperature corrector 1200 may multiply the color signals (R, G, B) by the experimentally pre-set gain control values (Rgain1, Ggain1, Bgain1) to calculate color temperature-corrected color signals (Rw, Gw, Bw).

$Rw = Rgain1 \times R$ $Gw = Ggain1 \times G$ $Bw = Bgain1 \times B$ [EQUATION 8]

The second color temperature corrector 1200a serves to correct the color temperatures of chromatic color region. For example, as shown in EQUATION 9, the second color temperature corrector 1200a may multiply the color signals (R, G, B) by the experimentally pre-set gain control values (Rgain2, Ggain2, Bgain2) to calculate color temperature-corrected color signals (Rw, Gw, Bw).

$Rw = Rgain2 \times R$ $Gw = Ggain2 \times G$ $Bw = Bgain2 \times B$ [EQUATION 9]

where, the Rw, Gw and Bw are color temperature-corrected R, G, B signals.

The color signals color temperature-corrected by the first and second color temperature corrector 1200, 1200a may be inputted into the selector 1202.

Successively, the selector 1202 may select the color signal color temperature-corrected by the first color temperature corrector 1200 in response to the signal determined by the color temperature determiner 102 or the color signal color temperature-corrected by the second color temperature corrector 1200a. In other words, the selector 1202 may select the color signal color temperature-corrected by the first color temperature corrector 1200 if the color temperature determiner 102 determines the achromatic color region, and select the color signal color temperature-corrected by the second color temperature corrector 1200a if the color temperature determiner 102 determines the chromatic color region.

Figure 13:
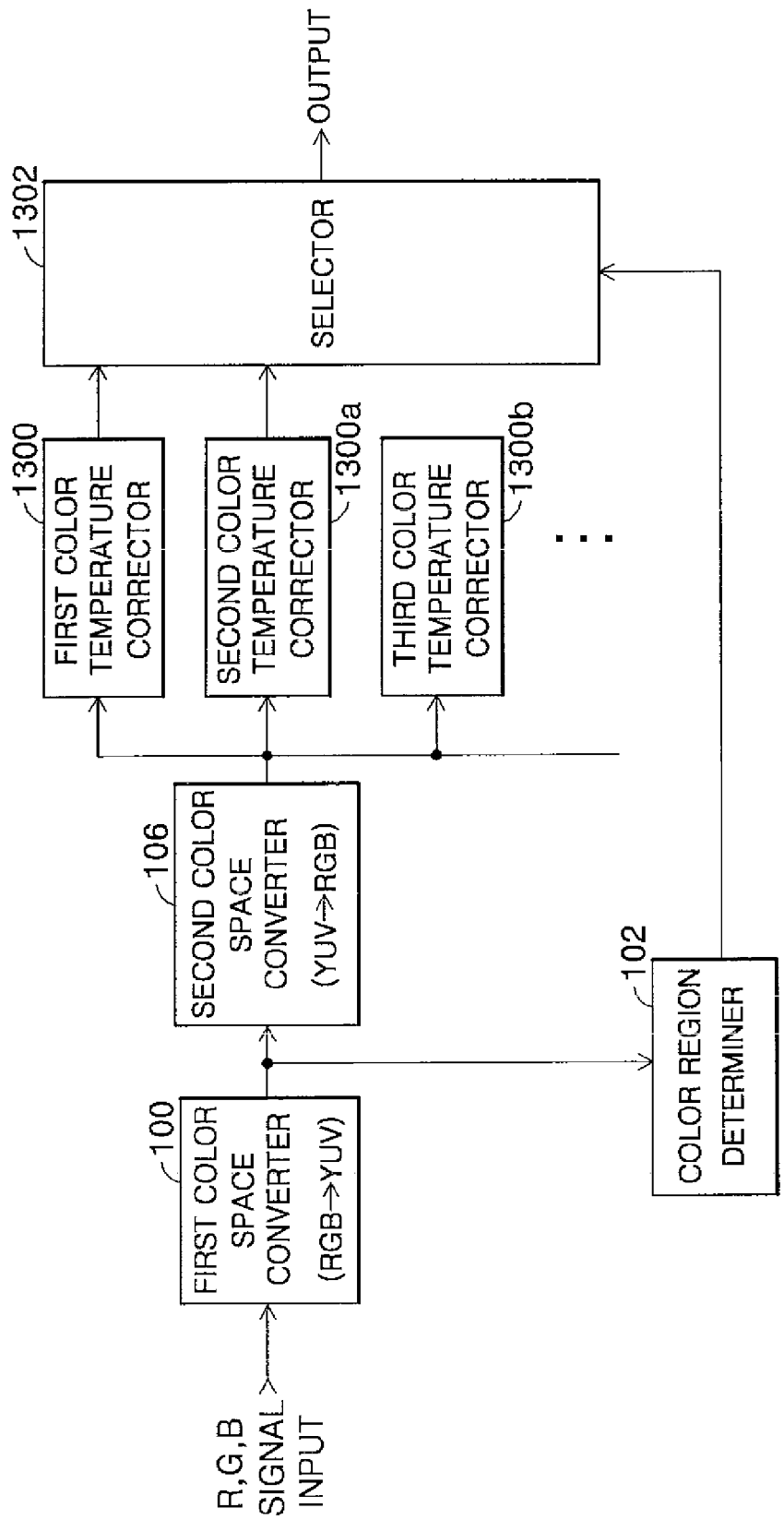
FIG. 13 is a block diagram illustrating an apparatus for controlling color temperature according to still another exemplary implementation.

FIG. 13 is a block diagram illustrating an apparatus for controlling color temperature according to still another exemplary implementation.

Referring to FIG. 13, the color region determiner 102 is pre-set with a plurality of achromatic color regions, a value of luminance signal (Y) belonging to a chromatic color region, and values of chroma signals (U,V), and a region coming under a relevant pixel is determined by the value of the luminance signal (Y) inputted from the first color space converter 100 and the chroma signals (U,V).

Figure 14:
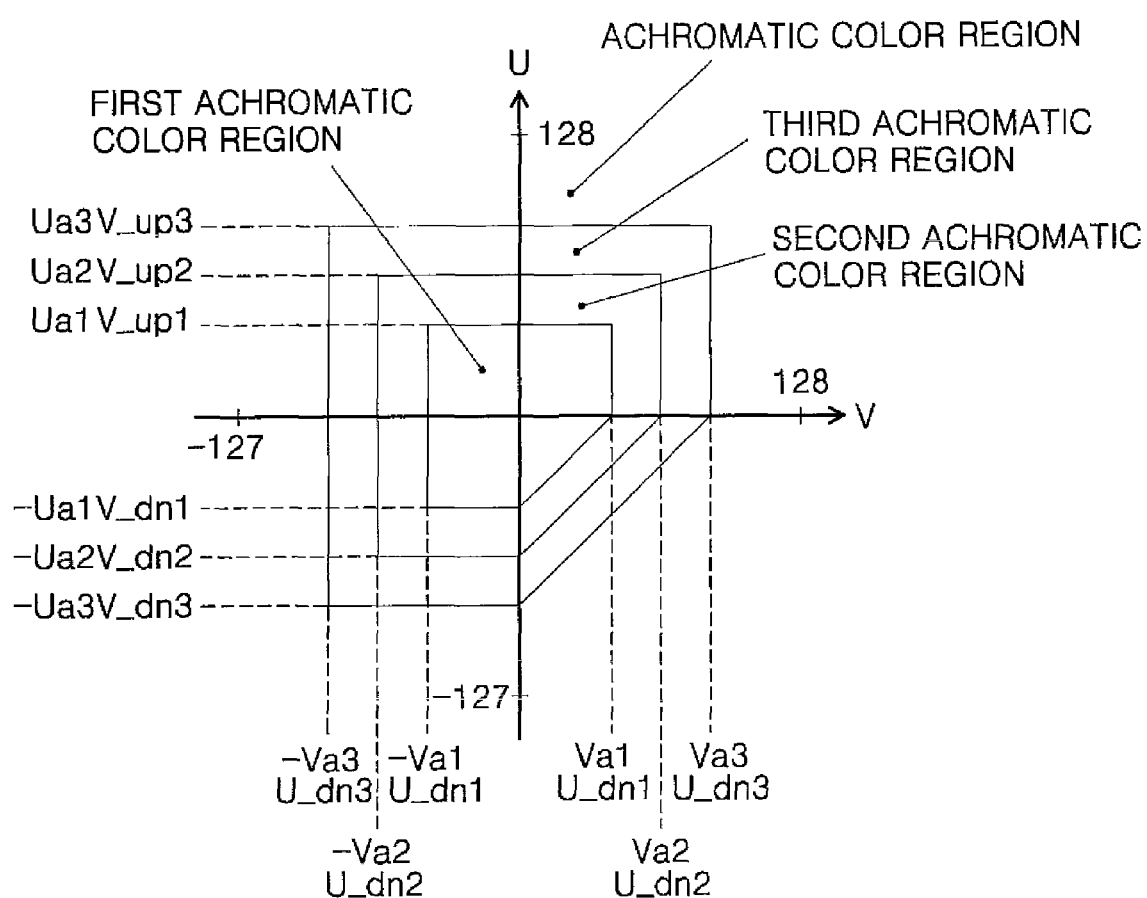
FIG. 14 is a schematic drawing illustrating a plurality of achromatic color regions and chromatic color regions set up according to an apparatus for controlling color temperature according to still another exemplary implementation.

For example, as illustrated in FIG. 14, the color region determiner 102 is pre-set with a chromatic color region and a plurality of first to third achromatic color regions, and scopes of values of the luminance signal (Y) and chroma signals (U,V) corresponding to the pre-set chromatic color region and the first to third achromatic color regions are pre-set.

In other words, a region composed of the value of the luminance signal $0 \leq Y \leq Ya$ and the values of chroma signals (U, V)–$Ua1 \leq U \leq Ua1$, $-Va1 \leq V \leq Va1$ and $U \geq V-Ua1$ is set up in advance as the first achromatic color region.

A region composed of the value of luminance signal $0 \leq Y \leq Ya$ and values of chroma signals (U,V)–$Ua2 \leq U \leq Ua2$, $-Va2 \leq V \leq Va2$ and $U \geq V-Ua2$, except for the first achromatic color region is set up in advance as the second achromatic color region.

A region composed of the value of luminance signal (Y) $0 \leq Y \leq Ya$ and the values of the chroma signals (U,V), $-Ua3 \leq U \leq Ua3$, $-Va3 \leq V \leq Va3$ and $U \geq V-Ua3$, except for the first and second achromatic color regions is pre-set beforehand as the third achromatic color region.

The remaining regions except for the value of luminance signal $0 \leq Y \leq Ya$ and the values of the chroma signals (U,V)–$Ua3 \leq U \leq Ua3$, $-Va3 \leq V \leq Va3$ and $U \geq V-Ua3$ are pre-set as the achromatic color region.

Furthermore, the color region determiner 102 may determine which region a relevant pixel belongs to out of the achromatic color region, the first to third achromatic color regions using the value of luminance signal (Y) of pixels inputted from the first color space converter 102 and the chroma signals (U,V), whereby a determination signal is generated and outputted to a selector 1302.

A plurality of color temperature controllers (1300, 1300a, 1300b . . . ) are interposed between an output terminal of the second color temperature corrector 106 and the selector 1302.

The plurality of color temperature controllers (1300, 1300a, 1300b, . . . ) may multiply the RGB color space signals outputted by the second color space converter 106, by one of the gain control values of the first to third achromatic color region and the chromatic color region to thereby control the color temperature, and an output signal of the color temperature controller 1300 or the color temperature controllers (1300a, 1300b, . . . ) is selected by the selector 1302 in response to the determination signal of the color region determiner 102 and the output signal is outputted.

For example, if the value of the luminance signal (Y) and the values of the chroma signals (U, V) belong to those of the first achromatic color region, the selector 1302 may select the output signal of the first color temperature controller 1300 in response to the determination signal of the color region determiner 102 and output the signal to the outside. If the value of the luminance signal (Y) and the values of the chroma signals (U, V) belong to the second achromatic color region, the selector 1302 may select the output signal of the second color temperature controller 1300a in response to the determination signal of the color region determiner 102 and output the signal to the outside. If the value of the luminance signal (Y) and the values of the chroma signals (U, V) belong to the third achromatic color region, the selector 1302 may select the output signal of the third color temperature controller 1300b in response to the determination signal of the color region determiner 102 and output the signal to the outside. If the value of the luminance signal (Y) and the values of the chroma signals (U, V) belong to the chromatic color region, the selector 1302 may select the output signal of a fourth color temperature controller 1300c in response to the determination signal of the color region determiner 102 and output the signal to the outside).

Figure 15:
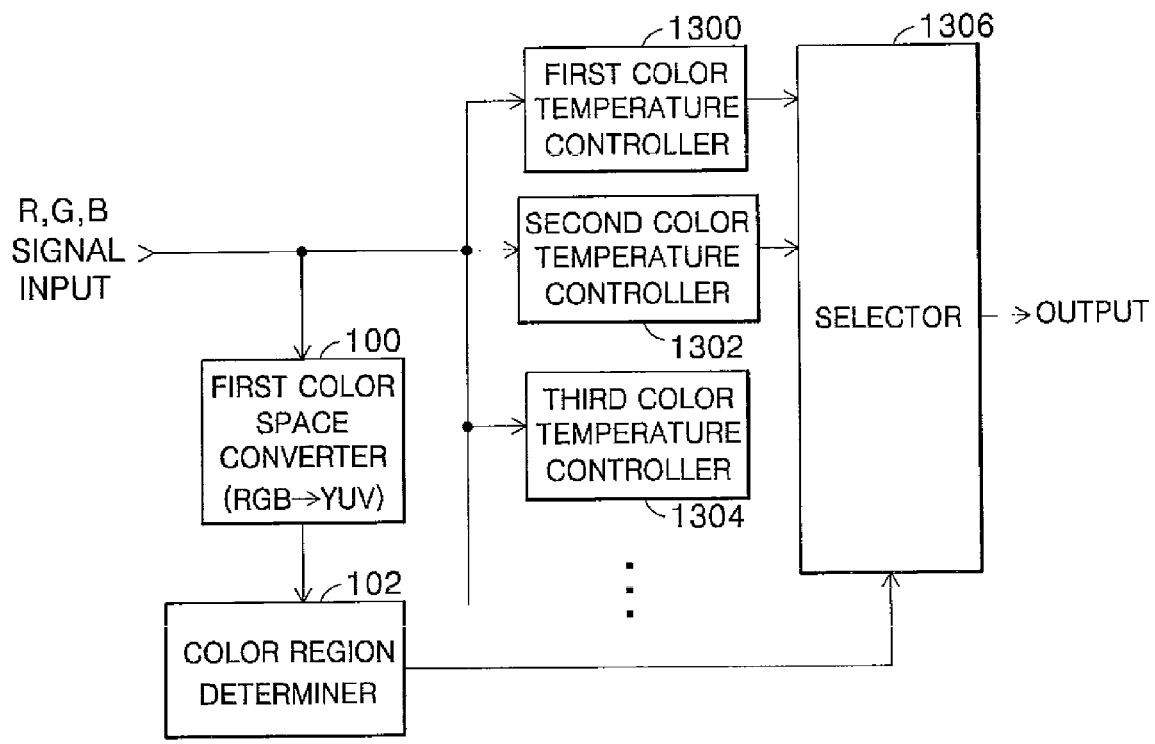
FIG. 15 is a block diagram illustrating an apparatus for controlling color temperature according to still another exemplary implementation.

FIG. 15 is a block diagram illustrating an apparatus for controlling color temperature according to still another exemplary implementation.

Referring to FIG. 15, the apparatus for controlling color temperature may be not disposed with the separate second color space converter 106 for converting the signal of the YUV color space converted by the first color space converter 100 to the RGB color space signal, and may multiply the RGB color space signals inputted from the outside by the gain control values experimentally pre-set by the plurality of color temperature controllers (1300, 1300a, 1300b, . . . ) to control the color temperatures, and the selector 1302 may select an output signal of a color temperature controller (1300 or 1300a, 1300b) in response to the determination signal of the color region determiner 102 and output the signal to the outsider.

Figure 16:
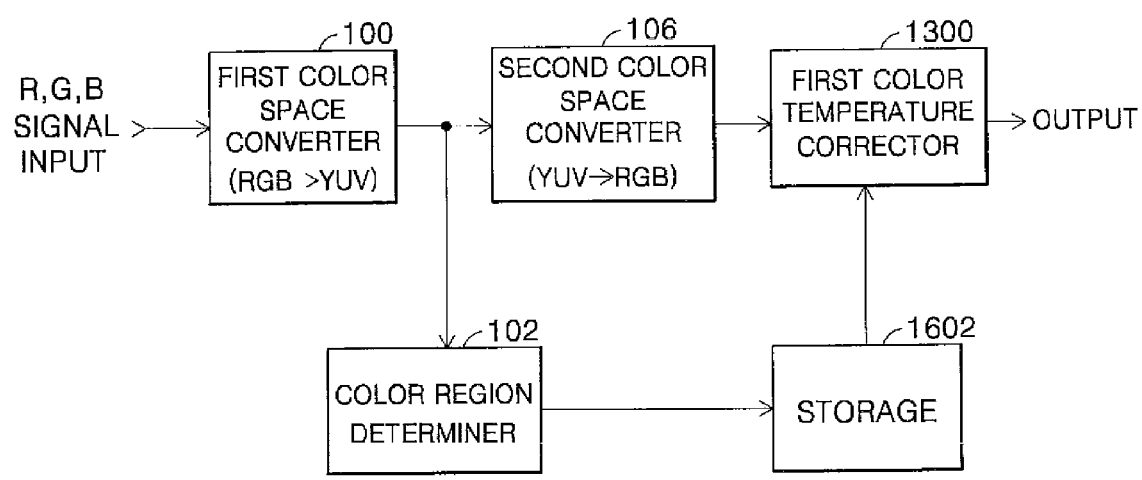
FIG. 16 is a block diagram illustrating an apparatus for controlling color temperature according to still another exemplary implementation.

FIG. 16 is a block diagram illustrating an apparatus for controlling color temperature according to still another exemplary implementation.

Referring to FIG. 16, the apparatus for controlling color temperature may use only one color temperature controller 1600. The apparatus may further include a storage 1602 that pre-stores a plurality of gain control values, and the storage 1602 may output a gain control value to the color temperature controller 1600 in response to the determination signal of the color region determiner 102.

In the instant implementation, the color region determiner 102 may determine which region, an achromatic color region or a chromatic color region, a relevant pixel belongs to, using the luminance signal (Y) inputted from the first color space converter 100 and the chroma signals (U, V). The color region determiner 102 may control the storage 1602 according to the determined color region to output a gain control value corresponding to the determined color region, and the outputted gain control value may be multiplied by the RGB color space signal by the color temperature controller 1600 to thereby control the color temperature.

While the general inventive concept has been described with reference to the particular illustrative exemplary implementations, it is not to be restricted by those implementations but only by the appended claims. It is to be appreciated that those skilled in the art may change or modify the implementations without departing from the scope and spirit of the present invention.

What is claimed is:

1. An apparatus for controlling color temperature comprising:
 a color region determiner determining whether values of luminance signal and chroma signals belong to a predetermined achromatic color region or a chromatic color region; and
 a color temperature corrector correcting a color temperature by controlling gains of the luminance signal and chroma signals as a result of the determination by the color region determiner, wherein the values of achromatic color region set up by the color region determiner are such that the value of the luminance signal (Y) satisfies the condition of $0 \leq Y \leq Ya$ (where, Ya is a predetermined experimental value), the chroma signals (U, V) satisfy all the conditions of $-Ua \leq U \leq Ua$ and $-Va \leq V \leq Va$ (where, Ua and Va are predetermined experimental values) on a UV plane, where the achromatic color region on a quadrant of the UV plane is a region that satisfies the conditions of $U \geq V-Ua$ (where, $-Ua \leq U \leq 0$ and, $0 \leq V \leq Va$).

2. The apparatus as claimed in claim 1, further comprising:
a first color space converter converting an inputted signal of RGB color space to an YUV color space signal and providing the converted YUV color space signal to the color region determiner; and
a second color space converter converting the luminance signal and the chroma signals corrected by the color temperature corrector to RGB color space signals.

3. An apparatus for controlling color temperature comprising:
a color region determiner determining whether values of luminance signal and chroma signals belong to a predetermined achromatic color region or a chromatic color region; and
a color temperature corrector correcting a color temperature by controlling gains of the luminance signal and chroma signals as a result of the determination by the color region determiner, wherein the values of achromatic color region set up by the color region determiner are such that the value of the luminance signal (Y) satisfies the condition of $0 \leq Y \leq Ya$ (where, Ya is a predetermined experimental value), the chroma signals (U, V) satisfy all the conditions of $-Ua \leq U \leq Ua$ and $-Va \leq V \leq Va$ (where, Ua and Va are predetermined experimental values) on a UV plane, where the achromatic color region on a quadrant of the UV plane is a region that satisfies the conditions of $(U-Ua)^2+(V-Va)^2 \geq Ua^2$ (where, $-Ua \leq U \leq 0$ and, $0 \leq V \leq Va$).

4. The apparatus as claimed in claim 1, wherein the achromatic color region is a region that satisfies the condition of $-Ua \leq U \leq Ua$ and $-Va \leq V \leq Va$, but a region that is larger than a value randomly connected by an operator between a coordinate (0, -Ua) and a coordinator (Va, 0).

5. An apparatus for controlling color temperature comprising:
a color region determiner determining whether values of luminance signal and chroma signals belong to a predetermined achromatic color region or chromatic color region; and
a color temperature corrector correcting a color temperature by controlling gains of the luminance signal and chroma signals as a result of the determination by the color region determiner, wherein the value of achromatic color region set up by the color region determiner is a region that satisfies the condition of $U^2+V^2 \leq Ua^2$ on the UV plane, but the achromatic color region on a quadrant of the UV plane is a region that satisfies the condition of $U \geq V-Ua$ (where, $-Ua \leq U \leq 0$ and, $0 \leq V \leq Va$), wherein U and V are values of chroma signals (U, V), and Ua and Va are values of chroma signals preset by a user.

6. The apparatus as claimed in claim 5, further comprising:
a first color space converter converting an inputted signal of RGB color space to a YUV color space signal and providing the converted luminance signal (Y) and chroma signals (UV) to RGB color space signals.

7. An apparatus for controlling color temperature comprising:
a color region determiner determining whether values of luminance signal and chroma signals belong to a predetermined achromatic color region or chromatic color region; and
a color temperature corrector correcting a color temperature by controlling gains of the luminance signal and chroma signals as a result of the determination by the color region determiner, wherein the value of achromatic color region set up by the color region determiner is a region that satisfies the condition of $U^2+V^2 \leq Ua^2$ on the UV plane, but the achromatic color region on a quadrant of the UV lane is are ion that satisfies the condition of $(U-Ua)^2+(V-Va)^2 \geq Ua^2$ (where, $-Ua \leq U \leq 0$ and, $0 \leq V \leq Va$), wherein U and V are values of chroma signals (U, V), and Ua and Va are values of chroma signals preset by a user.

8. The apparatus as claimed in claim 5, wherein the achromatic color region is a region that satisfies the condition of $U^2+V^2 \leq Ua^2$ and a region larger than a value randomly preconnected between a coordinate (0, -Ua) and a coordinate (Va, 0).

9. An apparatus for controlling color temperature comprising:
a block divider dividing an YUV color space signal into a block of predetermined size;
a color region determiner detecting pixels of achromatic color region existing within each block divided by the block divider and calculating the number of pixels in the achromatic region; and
a color temperature corrector correcting the color temperature of pixels in the block outputted by the block divider, by calculating a luminance signal average value of pixels in the achromatic color region determined by the color region determiner, the number of pixels in the achromatic color region calculated by the color region determiner, an average value of chroma signal of each pixel and a corrected value of each pixel using the variation average value of chroma signals of each pixel, wherein the color temperature corrector comprises:
a luminance average value calculator calculating the luminance average values of pixels in the achromatic color region determined by the color region determiner;
a chroma signal average calculator calculating average values of chroma signal of each pixel;
a chroma signal variation average value calculator calculating the average values of chroma signal variation of chroma signals of each pixel based on the chroma signal average values calculated by the chroma signal average value calculator; and
a weight calculator calculating each weight relative to the number of pixels in the achromatic color region determined by the color region determiner, the average values of chroma signal calculated by the chroma signal averaged value calculator and chroma signal variation average values calculated by the chroma signal variation average value calculator.

10. The apparatus as claimed in claim 9, further comprising:
a first color space converter converting RGB color space signals inputted from outside to YUV color space signals and inputting the signals to the block divider; and
a second color space converter the YUV color space signals color temperature-corrected by the color temperature corrector and outputting the signals to the outside.

11. The apparatus as claimed in claim 9, wherein the color region determiner comprises:
- an achromatic color pixel detector detecting achromatic region pixels out of pixels of each block outputted by the block divider; and
- an achromatic color pixel number calculator calculating the number of pixels in the achromatic color region detected by the achromatic color pixel detector.

12. The apparatus as claimed in claim 9, wherein the weight calculator pre-stores in a look-up table the weights relative to the average values of chroma signals, the variation average values of chroma signal and the number of achromatic color pixels, and calculates from the look-up table the inputted number of achromatic color pixels, the average values of chroma signals and the variation average values of chroma signal.

13. The apparatus as claimed in claim 9, wherein the weight relative to the average values of chroma signal is calculated by the following Equation, $$\begin{cases} W0 = 0, & \max(U\text{apl}, V\text{apl}) \le 128 - \alpha \text{ or} \\ & \max(U\text{apl}, V\text{apl}) > 128 + \alpha \\ W0 = \frac{1}{\alpha}\max(U\text{apl}, V\text{apl}) - \frac{128}{\alpha} - 1, & 128 - \alpha < \max(U\text{apl}, V\text{apl}) \le 128 \\ W0 = -\frac{1}{\alpha}\max(U\text{apl}, V\text{apl}) + \frac{128}{\alpha} + 1, & 128 < \max(U\text{apl}, V\text{apl}) \le 128 + \alpha \end{cases}$$

where, W0 is a weight of each average relative to U and V signal, Uapl and Vapl are average values of U and V signal in pixels, max(Uapl, Vapl) defines a larger value of the Uapl and Vapl, and α is an experimentally pre-set value based on each pixel value being in the range of 0~255.

14. The apparatus as claimed in claim 9, wherein the weight relative to the variation average value of chroma signal is calculated by the following Equation, $$\begin{cases} W1 = 1, & 0 < \frac{U\text{var} + V\text{var}}{2} \le \beta \\ W1 = -\frac{1}{255-\beta}\frac{U\text{var}+V\text{var}}{2} + \frac{\beta}{255-\beta} + 1, & \beta < \frac{U\text{var}+V\text{var}}{2} \end{cases}$$

where, W1 is a weight relative to each variation average value of U and V signals, Uvar and Vvar are variation average values of U and V signal, and β is an experimentally pre-set value based on each pixel value being in the range of 0~255.

15. The apparatus as claimed in claim 9, wherein the weight relative to the number of achromatic color pixel is calculated by the following Equation, $$\begin{cases} W2 = \frac{1}{\gamma}Wn, & 0 < Wn \le \gamma \\ W2 = 1, & \gamma < Wn \end{cases}$$

where, W2 is a weight relative to the number of achromatic color pixel and is an experimentally pre-set value.

16. The apparatus as claimed in claim 9, wherein the correction value calculator calculates the correction value according to the following Equation, $$\begin{cases} Uco = Y\text{apl} \times W0 \times W1 \times W2 \times U\text{gain} \\ Vco = Y\text{apl} \times W0 \times W1 \times W2 \times V\text{gain} \end{cases}$$

where, Uco and Vco are correction values, Yapl is a luminance average value of achromatic color pixels, W0, W1 and W2 are weights calculated by the weight calculator, and Ugain and Vgain are experimentally pre-set gain control values.

17. The apparatus as claimed in claim 9, wherein the corrector corrects the color temperature based on the following Equation, $$Y' = Y \times Y\text{gain}$$
$$\begin{cases} U'U \times Uco \\ V' = V \times Vco \end{cases}$$

where, Y', U' and V' are color temperature-corrected Y, U and V signal, Ygain is an experimentally pre-set gain control value, and Uco and Vco are correction values corrected by the correction value calculator.

18. The apparatus as claimed in claim 9, further comprising a block-by-block correction value interpolator between the correction value calculator and the color temperature corrector for interpolating correction values of each block.

19. The apparatus as claimed in claim 3, further comprising:
- a first color space converter converting an inputted signal of RGB color space to an YUV color space signal and providing the converted YUV color space signal to the color region determiner; and
- a second color space converter converting the luminance signal and the chroma signals corrected by the color temperature corrector to RGB color space signals.

20. The apparatus as claimed in claim 7, further comprising:
- a first color space converter converting an inputted signal of RGB color space to a YUV color space signal and providing the converted luminance signal (Y) and chroma signals (UV) to RGB color space signals.

* * * * *